(12) United States Patent
Cutter et al.

(10) Patent No.: US 12,142,300 B2
(45) Date of Patent: Nov. 12, 2024

(54) CONTENT SYSTEM WITH EVENT IDENTIFICATION AND AUDIO-BASED EDITING FEATURE

(71) Applicant: Roku, Inc., San Jose, CA (US)

(72) Inventors: Michael Cutter, Golden, CO (US); Sunil Ramesh, Cupertino, CA (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 115 days.

(21) Appl. No.: 18/051,568

(22) Filed: Nov. 1, 2022

(65) Prior Publication Data
US 2024/0144978 A1    May 2, 2024

(51) Int. Cl.
*G11B 27/036* (2006.01)
*G06V 20/40* (2022.01)

(52) U.S. Cl.
CPC ............ *G11B 27/036* (2013.01); *G06V 20/44* (2022.01)

(58) Field of Classification Search
CPC .............................. G11B 27/036; G06V 20/44
See application file for complete search history.

(56) References Cited

U.S. PATENT DOCUMENTS

| | | | |
|---|---|---|---|
| 9,838,731 B1* | 12/2017 | Matias | G11B 27/10 |
| 2022/0189173 A1* | 6/2022 | Zhou | G06F 40/30 |
| 2024/0062544 A1* | 2/2024 | Watanabe | G06V 20/46 |

* cited by examiner

*Primary Examiner* — Girumsew Wendmagegn
(74) *Attorney, Agent, or Firm* — McDonnell Boehnen Hulbert & Berghoff LLP (57) ABSTRACT

In one aspect, an example method includes (i) obtaining, by a computing system, video data representing video content; (ii) analyzing, by the computing system, the video data to identify an event that is a subject of the video content; (iii) using, by the computing system, the identified event as a basis to select audio content; and (iv) performing, by the computing system, an operation that facilitates editing the video content to include the selected audio content.

18 Claims, 11 Drawing Sheets

Training Data

| Video Data | Closed-Captioning Data | Event Description | Event Duration | Event Position |
|---|---|---|---|---|
| Video data V1 | "[GLASS BREAKING SOUND]" | Glass breaking | 00:00:02:00 | 00:01:32:14 - 00:01:34:14 |
| Video data V2 | "[GUNSHOT SOUND]" | Gunshot | 00:00:01:04 | 00:00:14:02 - 00:00:15:06 |
| Video data V3 | "[EXPLOSION SOUND]" | Explosion | 00:00:03:02 | 00:00:22:01 - 00:00:25:03 |
| Video data V4 | "[CAR CRASH SOUND]" | Car crash | 00:00:03:01 | 00:22:04:01 - 00:22:07:02 |
| Video data V5 | "[DOOR SLAMMING SHUT SOUND]" | Door slamming shut | 00:00:01:01 | 00:04:09:00 - 00:04:10:01 |
| Video data V6 | "[DOOR SLAMMING SHUT SOUND]" | Door slamming shut | 00:00:01:06 | 00:00:07:00 - 00:00:08:06 |
| Video data V7 | "[LOUD DOOR CLOSING SOUND]" | Door slamming shut | 00:00:01:03 | 00:00:03:04 - 00:00:04:07 |
| Video data V8 | "[EXPLOSION SOUND]" | Explosion | 00:00:02:02 | 00:31:10:01 - 00:31:12:03 |
| Video data V9 | "[FIRE EXPLOSION]" | Explosion | 00:00:01:04 | 00:00:05:01 - 00:00:06:05 |
| Video data V10 | "[DOOR SLAMMING SHUT SOUND]" | Door slamming shut | 00:00:01:01 | 00:06:08:00 - 00:06:09:01 |
| Video data V11 | "[DOOR SLAMMING SHUT]" | Door slamming shut | 00:00:01:06 | 00:00:07:00 - 00:00:08:06 |
| Video data V12 | "[CAR CRASHING SOUND]" | Car crash | 00:00:02:03 | 00:10:14:02 - 00:10:16:05 |
| Video data V13 | "[DOOR SLAMMING SHUT SOUND]" | Door slamming shut | 00:00:01:01 | 00:00:09:00 - 00:00:10:01 |
| Video data V14 | "[GLASS SHATTERING SOUND]" | Glass breaking | 00:00:01:01 | 00:04:08:00 - 00:04:09:01 |
| ... | ... | ... | ... | ... |

Figure 3

| Mapping Data 400 | | |
|---|---|---|
| Event Description | Event Duration | Audio Content |
| Glass breaking | 00:00:01:02 | Audio content A1 |
| Glass breaking | 00:00:01:08 | Audio content A2 |
| Glass breaking | 00:00:02:01 | Audio content A3 |
| Glass breaking | 00:00:02:07 | Audio content A4 |
| Glass breaking | 00:00:03:01 | Audio content A5 |
| Explosion | 00:00:01:01 | Audio content A6 |
| Explosion | 00:00:01:03 | Audio content A7 |
| Explosion | 00:00:02:02 | Audio content A8 |
| Explosion | 00:00:02:08 | Audio content A9 |
| Gunshot | 00:00:01:01 | Audio content A10 |
| Gunshot | 00:00:01:06 | Audio content A11 |
| Gunshot | 00:00:02:03 | Audio content A12 |
| Car crash | 00:00:01:01 | Audio content A13 |
| Car crash | 00:00:03:01 | Audio content A14 |
| ... | ... | |

CONTENT SYSTEM WITH EVENT IDENTIFICATION AND AUDIO-BASED EDITING FEATURE

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is described. The method includes (i) obtaining, by a computing system, video data representing video content; (ii) analyzing, by the computing system, the video data to identify an event that is a subject of the video content; (iii) using, by the computing system, the identified event as a basis to select audio content; and (iv) performing, by the computing system, an operation that facilitates editing the video content to include the selected audio content.

In another aspect, an example computing system is described. The computing system is configured for performing a set of acts including (i) obtaining, by the computing system, video data representing video content; (ii) analyzing, by the computing system, the video data to identify an event that is a subject of the video content; (iii) using, by the computing system, the identified event as a basis to select audio content; and (iv) performing, by the computing system, an operation that facilitates editing the video content to include the selected audio content.

In another aspect, a non-transitory computer-readable medium is described. The non-transitory computer-readable medium has stored thereon program instructions that upon execution by a computing system, cause performance of a set of acts. The set of acts include (i) obtaining, by the computing system, video data representing video content; (ii) analyzing, by the computing system, the video data to identify an event that is a subject of the video content; (iii) using, by the computing system, the identified event as a basis to select audio content; and (iv) performing, by the computing system, an operation that facilitates editing the video content to include the selected audio content.

DETAILED DESCRIPTION

I. Overview

In the context of video content production, after video content is recorded, the content is typically put through a process called post-production where content is edited in various ways. For example, during post-production, the color of the video content may be adjusted or video effects may be added. As another example, sound effects may be added.

The process of adding sounds effects is especially tedious and time consuming. Among other things, to do this, an editor may need to manually document an event (e.g., glass breaking) that is a subject of the recorded video content, record audio content with an appropriate duration such that it can be used as a sound effect for that event, and, often through a trial-and-error type approach, continually adjust the positioning of the audio content relative to the video content to properly align the audio content with the video content.

The disclosed systems and methods provide an improved approach to adding sound effect (or other audio content) to video content. In an example implementation, an editing system obtains video data representing video content and analyzes the video data to identify an event that is a subject of the video content. The editing system can do this in various ways, such as by employing a machine learning technique that uses a deep neural network to train a model to use video data and/or associated metadata such as closed-captioning data, as input data, to generate corresponding event identification data, as output data.

As such, in one example, the video editor can use video data representing video content of a glass breaking, along with closed-captioning data including the text "[GLASS BREAKING SOUND]," to generate corresponding event identification data. The event identification can include an event description, such as "glass breaking," and perhaps a duration of the event within the video content and/or a position of the event within the video content.

The video editor can then use the identified event as a basis to select audio content. In one example, this can involve the video editor using mapping data to map the generated event identification data to corresponding audio content. As such, the video editor can select audio content that is suitable to be added to the video content. The video editor can then edit or facilitate editing the video content to include the selected audio content. Moreover, the video editor can leverage the event duration and/or event position information generated by the model to help suitably align the selected audio content with the event of the video content.

Among other things, these techniques provide a simpler, more efficient, and more accurate way to add sound effects or other audio content to video content. Various other features of these systems and methods are described hereinafter with reference to the accompanying figures.

II. Example Architecture

A. Content System

Figure 1:
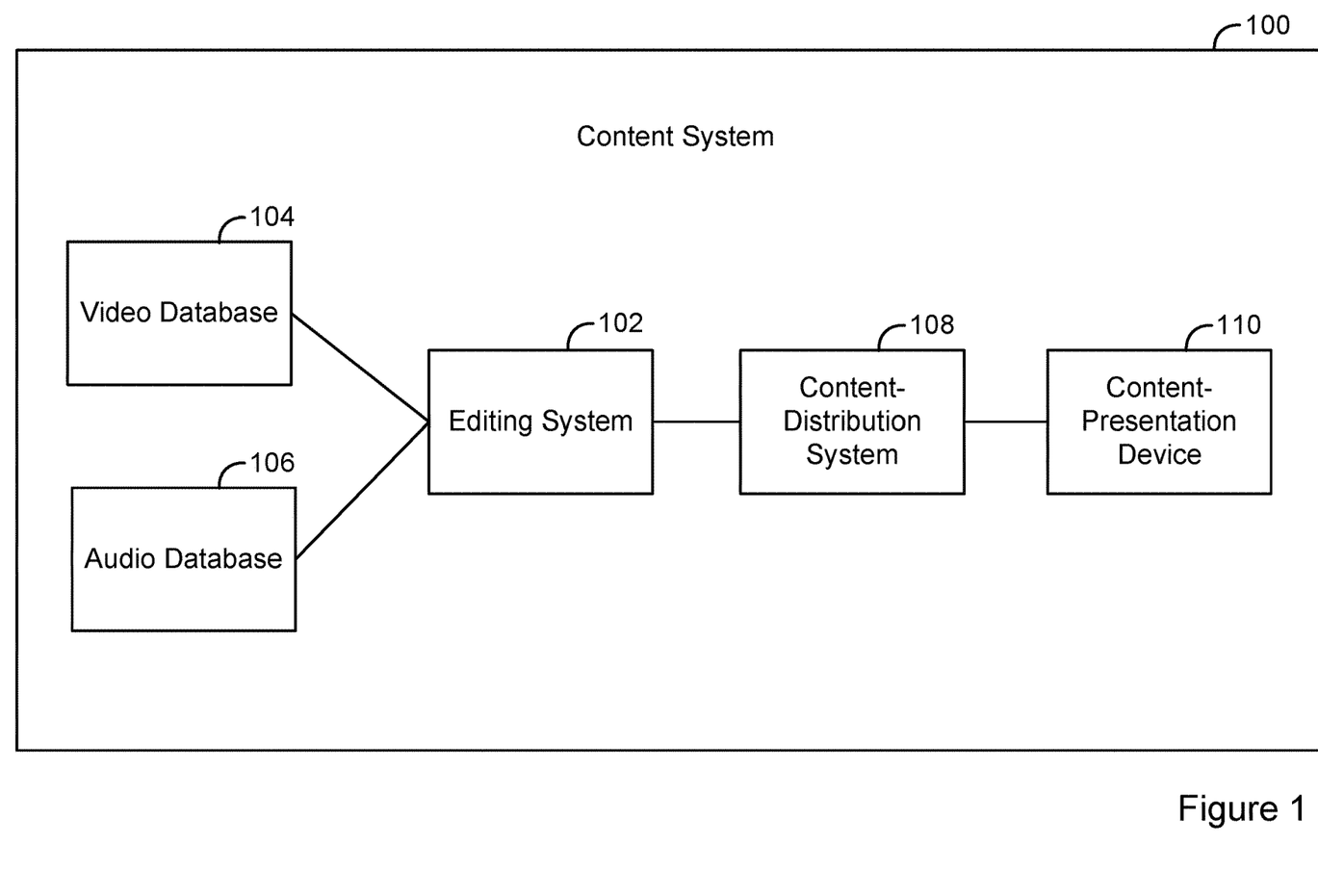
FIG. 1 is a simplified block diagram of an example content system in which various described principles can be implemented.

FIG. 1 is a simplified block diagram of an example content system 100. The content system 100 can include various components, such as an editing system 102, a video database 104, an audio database 106, a content-distribution system 108, and a content-presentation device 110.

The content system 100 can also include one or more connection mechanisms that connect various components within the content system 100. For example, the content system 100 can include the connection mechanisms represented by lines connecting components of the content system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

In some instances, the content system 100 can include multiple instances of at least some of the described components. The content system 100 and/or components thereof can take the form of a computing system, an example of which is described below.

B. Computing System

Figure 2:
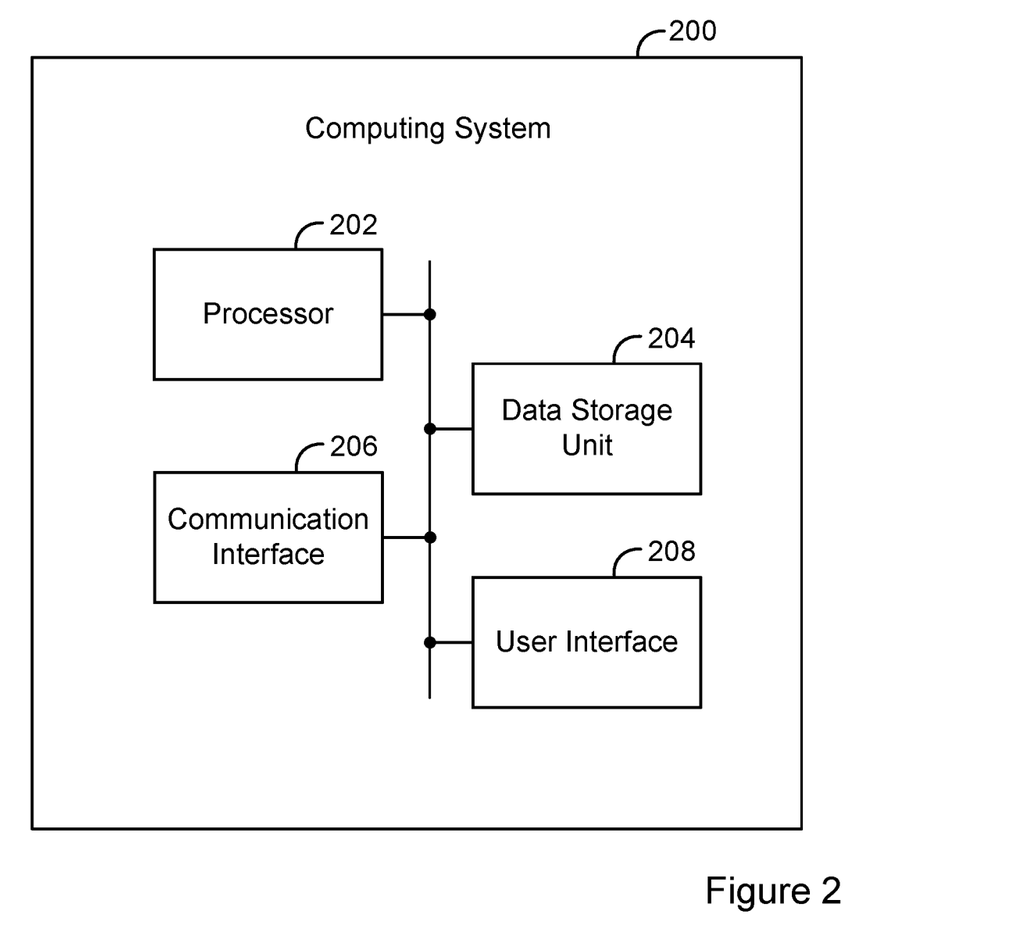
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content system 100 and/or components thereof can take the form of a computing system, such as the computing system 200. In some cases, some or all these entities can take the form of a more specific type of computing system, such as a desktop computer, a laptop, a tablet, a mobile phone, a television, or a set-top box or content streaming stick, among other possibilities.

III. Example Operations

The content system 100 and/or components thereof can be configured to perform and/or can perform one or more operations. Examples of these operations and related features will now be described with reference to various figures.

A. Obtaining Video Data

To begin, the editing system 102 can obtain video data, which represents video content. Video content can be or include a movie, a television show, or a commercial, or a portion or combination thereof, among numerous other possibilities.

Generally, video data can be generated, stored, and/or organized in various ways and according to various formats and/or protocols, using any related techniques now know or later discovered. For example, video data can be stored and organized as a Multimedia Database Management System (MDMS) and/or in various digital file formats, such as the MPEG-4 format, among numerous other possibilities. The video data can represent the video content by specifying various properties of the video content, such as luminance, brightness, and/or chrominance values, and/or derivatives thereof. In some instances, the video data can be used to generate the represented video content. But in other instances, the video data can be a fingerprint or signature of the video content, which represents the video content and/or certain characteristics of the video content and which can be used for various purposes (e.g., to identify the video content or characteristics thereof), but which is not sufficient at least on its own to generate the represented video content.

In some instances, video content can include an audio content component and/or associated metadata. In the case where the video content includes an audio content component, the audio content is generally intended to be presented in sync together with the video content. To help facilitate this, the video data can include metadata that associates portions of the video content with corresponding portions of the audio content. For example, the metadata can associate a given frame or frames of video content with a corresponding portion of audio content. In some cases, audio content can be organized into one or more different channels or tracks, each of which can be selectively turned on or off, or otherwise controlled.

Video data can also include other types of metadata associated with the video content. For example, the video data (and/or its audio data component) can include closed-captioning data. Closed-captioning is a service that was developed for the hearing impaired. When closed-captioning is enabled on a device such as the content-presentation device 110, video content and corresponding closed-captioning text (or other content) is displayed (e.g., as an overlay on top of the video content) as the content-presentation device 110 presents the video content. The closed-captioning text can represent or refer to, for example, spoken dialog, sound effects, or other portions of the audio content component of the video content, thereby helping a user of the content-presentation device 110 to comprehend what is being presented. Closed-captioning can also be disabled on the content-presentation device 110 such that the video content can be displayed without the closed-captioning text.

Closed-captioning text can be generated in various ways. For example, a computer-based automatic speech-recognition system can convert spoken dialog into text. As another example, an individual listening to audio content can manually type out corresponding text. After the closed-captioning text is generated, it can be encoded and stored in the form of closed-captioning data, which can then be embedded in or otherwise associated with the corresponding video content and/or audio content. A content-presentation device can then extract the closed-captioning data and display the closed-captioning text (or other content) as the video content is being presented.

In one example, video data can be stored in the video database 104 and the editing system 102 can obtain video data from the video database 104. In some cases, the editing system 102 can obtain video data based on input received via user interface of the editing system 102. For example, the editing system 102 can select video data based on selection input (e.g., a selection of a given a movie, a television show, a commercial, or a portion thereof) received from a user via a user interface, and then the editing system 102 can retrieve the video data corresponding to that selection.

B. Analyzing Video Content to Identify an Event

After the editing system 102 obtains the video data representing the video content, the editing system 102 can analyze the video data to identify an event that is a subject of the video content. Although the disclosure is not so limited, some events of note within the context of this disclosure are ones likely to be associated with distinct sound effects, such as events of glass breaking, a gunshot, an explosion, a car crash, or a door slamming shut, among numerous other possibilities.

In some examples, the video content can be a recording of a live-action event. In other examples, the video content can be synthetically generated (but might appear as if the video content was a recording of a live-action event), or perhaps some combination thereof.

The editing system 102 can analyze the video data to identify the event in various ways. As one example, the editing system 102 can do so by employing a machine learning technique, such as one that uses a deep neural network (DNN) to train a model to use video data and/or associated metadata, as input data, to generate corresponding event identification data, as output data.

Notably though, before the editing system 102 uses a model to analyze the video data to identify the event, the editing system 102 can first train the model by providing it with training input data and training output data. The training input data can include video data and/or associated metadata, and the training output data can include event identification data.

Starting with the training input data, as noted above, this can include video data. For example, the video data can include video data representing video content of glass breaking. In some instances, the training input data can also include associated metadata, such as associated closed-captioning data. For instance, closed-captioning data associated with the video content of glass breaking could include the closed-captioning text "[GLASS BREAKING SOUND]."

Moving on to the training output data, as noted above, this can include event identification data, which itself can include one or more components. For example, the event identification data can include an event description, which can include a word and/or phrase that describes the event. For example, continuing with the example where the video content is of glass breaking, the event description could be "glass breaking" or the like.

The event identification data can also include an event duration and/or event position that specifies the duration of the event within the video content and/or where within the video content the event occurs. The event duration and/or the event position can be specified in various ways, such as by specifying the duration of the event within the video content, by specifying a starting frame and/or an editing frame of the event within the video content, and/or by specifying a starting time point and/or an ending time point (in either case, perhaps represented as an offset from a reference point such as the start of the video content) of the event within the video content, among other possibilities. For example, in the case where the video content at issue has a duration of 00:00:60:00 (in "hours::minutes::seconds::frames" format), where the portion of the video content that includes the glass breaking is 00:00:02:00 in duration, and where that portion spans from a starting time offset from the start of the video content of 00:00:32:14 until an ending time offset from the start of the video content of 00:00:34:14, the event duration can be represented as 00:00:60:00 and the event position can be represented as 00:01:32:14-00:01:34:14.

Figure 3:
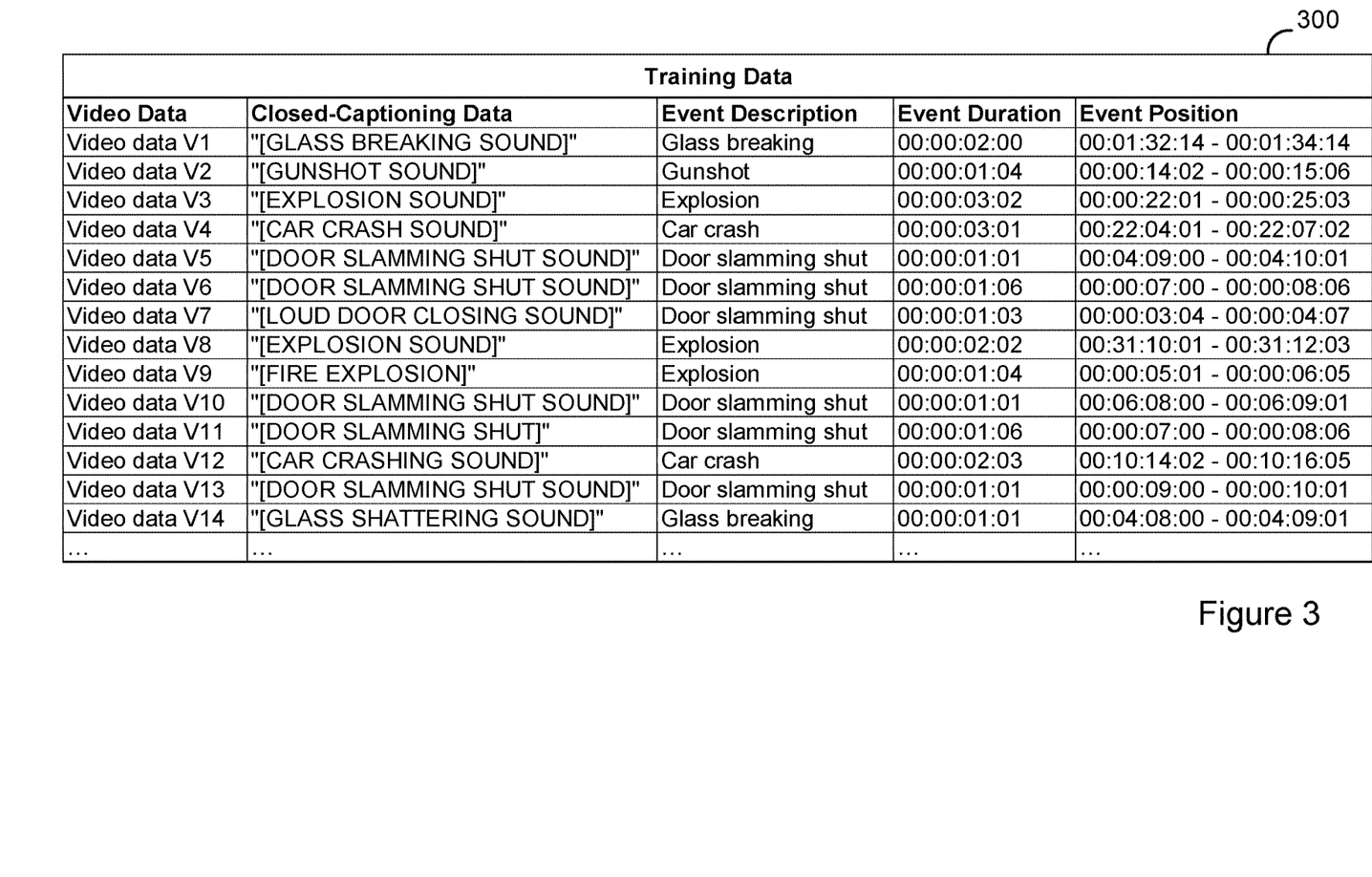
FIG. 3 is a diagram of example training data for use in training a model that uses video data and/or associated metadata, as input data, to generate corresponding event identification data, as output data.

FIG. 3 illustrates example training data 300. As shown, the training data includes multiple training data sets (each represented as a separate row in the table), each of which includes video data, closed-captioning data, an event description, an event duration, and an event position.

As such, in line with the example discussed above, in a first example set of training data, the training input data can include video data V1 representing video content that includes glass breaking, and can further include the closed-captioning text "[GLASS BREAKING SOUND]." And the training output data can include event information data that includes an event description of "glass breaking." The event information data can further include duration data that specifies 00:00:02:00 and position data that specifies 00:01:32:14-00:01:34:14.

Likewise, in a second example set of training data, the training input data can include video data V2 representing video content that includes a gunshot, and can further include the closed-captioning text "[GUNSHOT SOUND]." And the training output data can include event information data that includes an event description of "gunshot." The event information data can further include duration data that specifies 00:00:01:04 and position data that specifies 00:00:14:02-00:00:15:06.

In a third example set of training data, the training input data can include video data V3 representing video content that includes an explosion, and can further include the closed-captioning text "[EXPLOSION SOUND]." And the training output data can include event information data that includes an event description of "explosion." The event information data can further include duration data that specifies 00:00:03:02 and position data that specifies 00:00:22:01-00:00:25:03.

Additional training data sets (for the same or different types of events, with the same or different video data, closed-captioning data, event descriptions, event durations, event positions, etc.), such as the additional example training data sets shown as part of the example training data 300, can be used to train or further train the model. In practice, it is likely that large amounts of training data—perhaps thousands of training data sets of more—would be used to train the model as this generally helps improve the usefulness of the model.

Training data can be generated in various ways, including by being manually assembled. However, in some cases, the one or more tools or techniques, including any training data gathering or organization techniques now known or later discovered, can be used to help automate or at least partially automate the process of assembling training data.

After the model is trained, the editing system 102 can then provide to the model runtime input data, which the model can use to generate runtime output data. Generally, the runtime input data is of the same type as the training input data as described above.

As such, in a first runtime example, the runtime video content (which could be different from the video content used to train the model) can include video content that includes a glass breaking and can further include corresponding closed-captioning text "[GLASS BREAKING SOUND]" that is associated with the video content. The model can then use this runtime input data to generate runtime output data, which is of the same type as the output data as described above.

As such, continuing with the first runtime example, the runtime output data can include event information data that includes an event description of "glass breaking." In addition, the event information data can include an event duration and/or an event position that specifies that the portion of the video content that includes the glass breaking is 00:00:02:02 in duration, and that it spans from a starting time offset from the start of the video content of 00:00:12:08 until an ending time offset from the start of the video content of 00:00:14:10.

Thus, more generally, responsive to the editing system 102 providing the video content to the trained model, the editing system 102 can receive from the trained model, corresponding generated event identification data, including an event description, an event duration, and an event position.

It should be noted that in some cases, the specific types of training data and/or runtime data can include some or all of the different components described above, and perhaps other component as well. Also, the model, the training data, and the runtime data can be stored in and/or operation within, the editing system 102 or the audio database 106, for instance.

C. Using the Identified Event as a Basis to Select Audio Content

After the editing system 102 identifies the event that is the subject of the video content, the editing system 102 can then use the identified event as a basis to select audio content. The editing system 102 can do this in various ways. For example, this can involve the editing system 102 using mapping data to map the event identification data (which can include one or more components, such an event description and an event duration) of the identified event to the audio content. This mapping data can be stored in the editing system 102 or the audio database 106, for example. As such, in one example, event information data that includes an event description of "glass breaking" and an event duration of 00:00:02:00, can map to audio content A1 (which is audio content of glass breaking).

Figure 4:
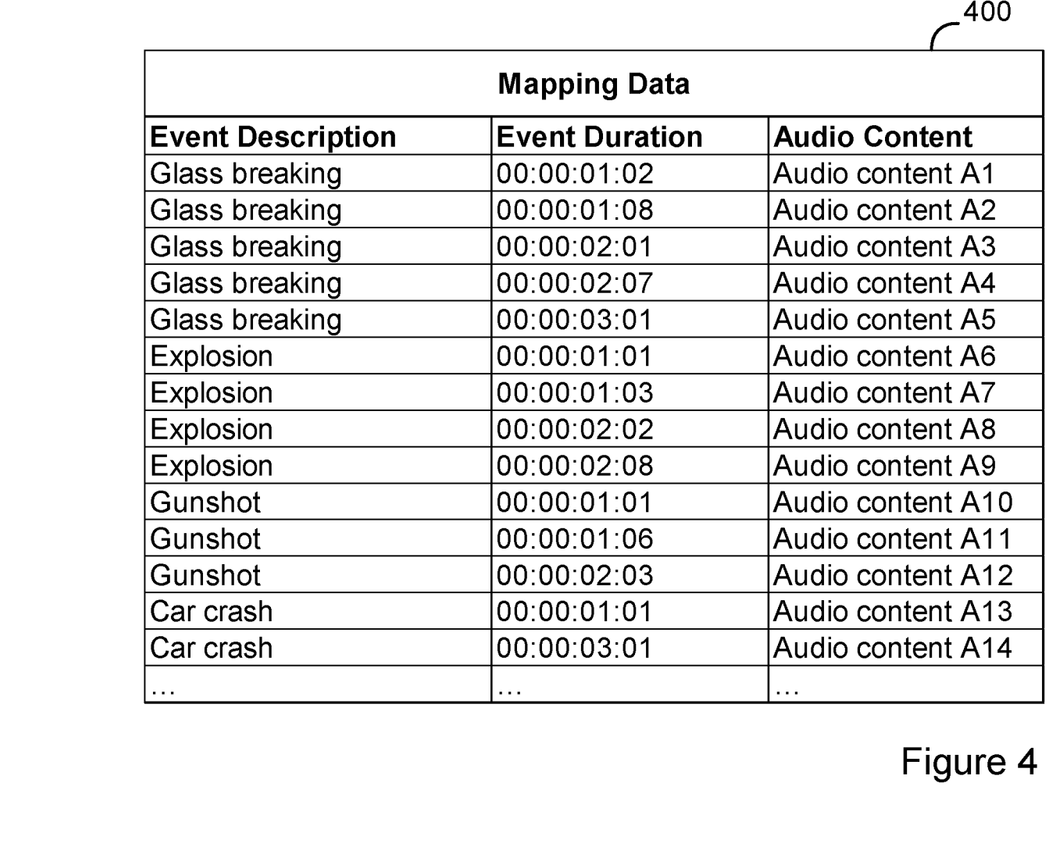
FIG. 4 is a simplified block diagram of example mapping data that maps event identification data to audio content.

FIG. 4 illustrates example mapping data 400. As shown, the mapping data 400 includes multiple mapping data sets (each represented as a separate row in the table), each of which includes an event description and/or an event duration, which together maps to corresponding audio content.

As such, in line with the example discussed above, in a first example set of mapping data, the mapping data can include the event description "glass breaking" and the event duration 00:00:01:04, mapping to the audio content A1 (which is audio content of glass breaking).

Likewise, in a second example set of mapping data, the mapping data can include the event description "glass breaking" and the event duration 00:00:02:03, mapping to the audio content A2 (which is also audio content of glass breaking, but of a different duration).

In a third example set of mapping data, the mapping data can include the event description "glass breaking" and the event duration 00:00:03:01, mapping to the audio content A3 (which is also audio content of glass breaking, but of yet another duration).

The mapping data can include additional mapping data sets (for the same or different event descriptions, event durations, video content, etc.), such as the additional example mapping data sets shown as part of the example mapping data 400, can also be part of the mapping data. In practice, it is likely that the mapping data will include large amounts of mapping data—perhaps thousands of mapping data sets or more. Mapping data can be generated in various ways, including by being manually assembled. However, in some cases, the one or more tools or techniques, including any data gathering or organization techniques now known or later discovered, can be used to help automate or at least partially automate the process of assembling mapping data.

In one instance, closed-captioning data can be leveraged to help generate and/or assemble the mapping data. Indeed, since existing video content can have closed-captioning text (e.g., GLASS BREAKING or EXPLOSION) associated with a given portion of the video content that include corresponding audio content portions (e.g., of glass breaking or an explosion), such data can be extracted and used to help generating the mapping data as described above.

Thus, more generally, with access to this mapping data, for a given event description, or perhaps a given pairing of an event description and an event duration, the editing system 102 can use the mapping data to map the event description and/or the event duration to corresponding audio content. For instance, for the video content having the identified event with the event description of "glass breaking" and an event duration of 00:00:02:00 as discussed above, the editing system 102 can use the first mapping data set of the mapping data 400 to map to and therefore select the audio content A1 (which is audio content of glass breaking, with a duration of 00:00:02:00).

By selecting the audio content in this way, the editing system 102 can select appropriate audio content that includes a sound effect of an event of the corresponding video content, and that is of an appropriate duration (in view of the duration of the event) as well. Notably, in some instances, it may be desirable to apply a fuzzy logic algorithm or the like to help ensure that, even if the event information data generated from model does not exactly match the event information data from the mapping data, the editing system 102 can detect near matches (e.g., with techniques being applied to search for similar event descriptions and/or to search for event durations within some threshold tolerance range), to allow the editing system 102 to still select audio content that may be desirable to associate with the video content.

D. Editing the Video Content to Include the Selected Audio Content

After the editing system 102 has selected the audio content, the editing system 102 can edit and/or facilitate editing the video content to include the selected audio content. The editing system 102 can do this in various ways.

To begin with, the editing system 102 can obtain audio data representing the audio content. In one example, the audio data can be stored in the audio database 106 and the editing system 102 can obtain audio data from the audio database 106. In some cases, the editing system 102 can use an identifier or other associated data to obtain corresponding audio data within the audio database.

As noted above, the editing system 102 can edit the video content to include the selected audio content in various ways. For instance, the editing system 102 can do so by adding the selected audio content to the video content. This could be added as a new audio track, channel, etc., or could perhaps be added as additional audio content within some existing audio track (i.e., by combining existing audio content with the new audio content, channel, etc., such as by employing any audio adding/summing technique now known or later discovered).

As part of this process, the editing system 102 can consider the event duration and/or the event position of the video content, and the duration of the selected audio content, to determine how best to align and synchronize the video content and the audio content.

Figure 5:
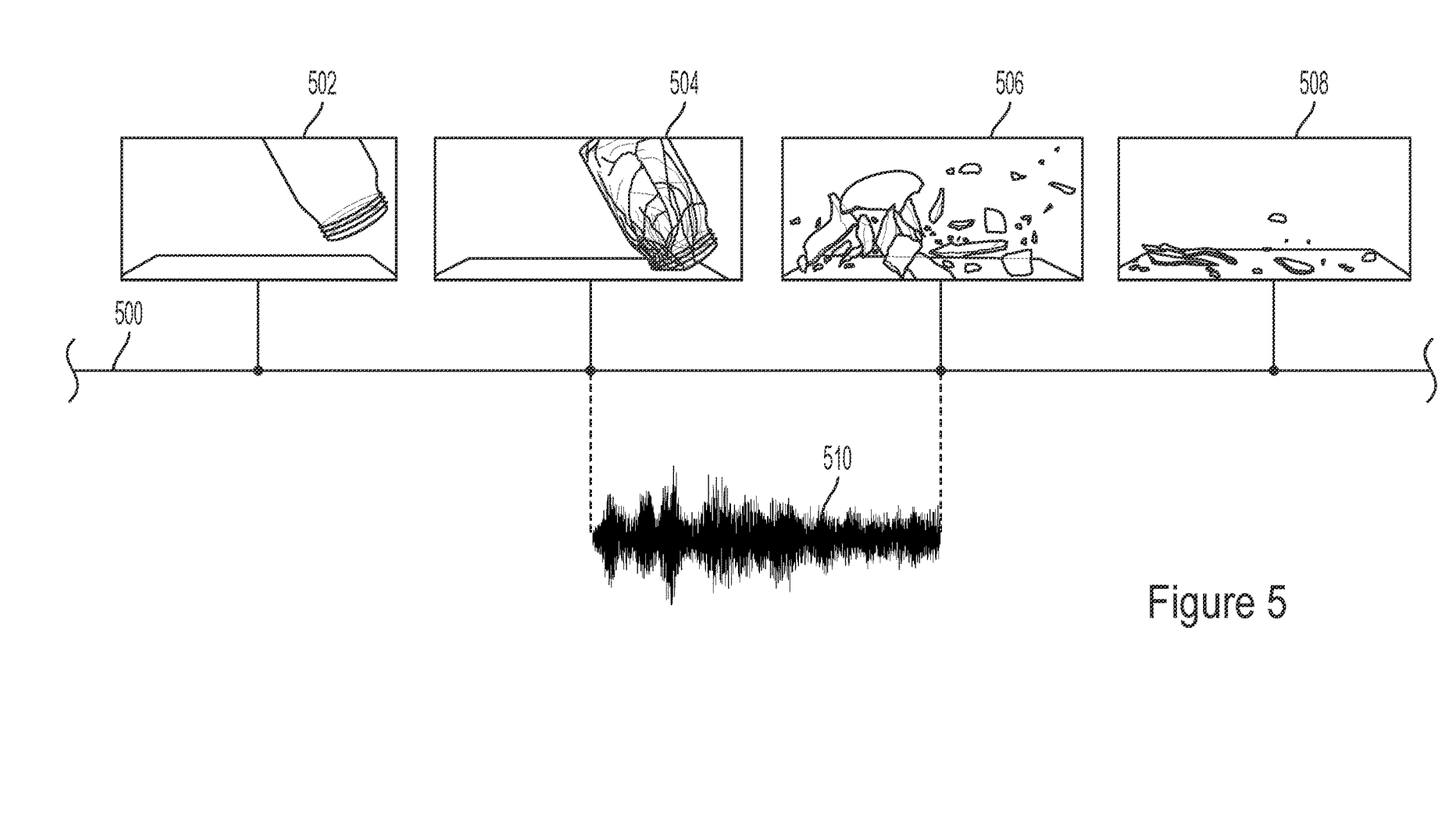
FIG. 5 is a simplified representation of example video content and corresponding audio content, with a first alignment example.

FIG. 5 is a simplified representation of example video content and corresponding audio content, with a first alignment example. The video content 500 is depicted along a horizontal axis that represents time, with four example frames/time points of the video content being noted. The first frame 502 depicts a glass just before it is about to hit a table. The second frame 504 depicts the glass just as it hits the table and starts to break. The third frame 506 depicts the glass just as it finishes breaking. And the fourth frame 508 depicts the broken glass pieces at rest after the glass broke.

The corresponding audio content is that of glass breaking (i.e., a glass breaking sound effect) and is associated with the video content such that the audio content corresponds to the portion of the video content spanning from the second frame 504 to the third frame 506. As such, the audio content exactly aligns with the event position.

In situations where the durations of the event and the audio content do not match, the editing system 102 can apply one or more rules or techniques to position the audio content in such a way so as to minimize any perceivable alignment discrepancies. For example, the editing system 102 can position the audio content such that the start of the audio content aligns with the start of the event, or such that the end of the audio content aligns with the end of the event. As another option, the editing system 102 can position the audio content such that the center of the audio content aligns with the center of the event. In some instances, the editing system 102 can also edit the audio content (e.g., by compressing or expanding the audio content, or by truncating the audio content, etc.) to further improvement alignment or to provide additional alignment options. Some additional figures illustrating examples along these lines will now be described.

Figure 6:
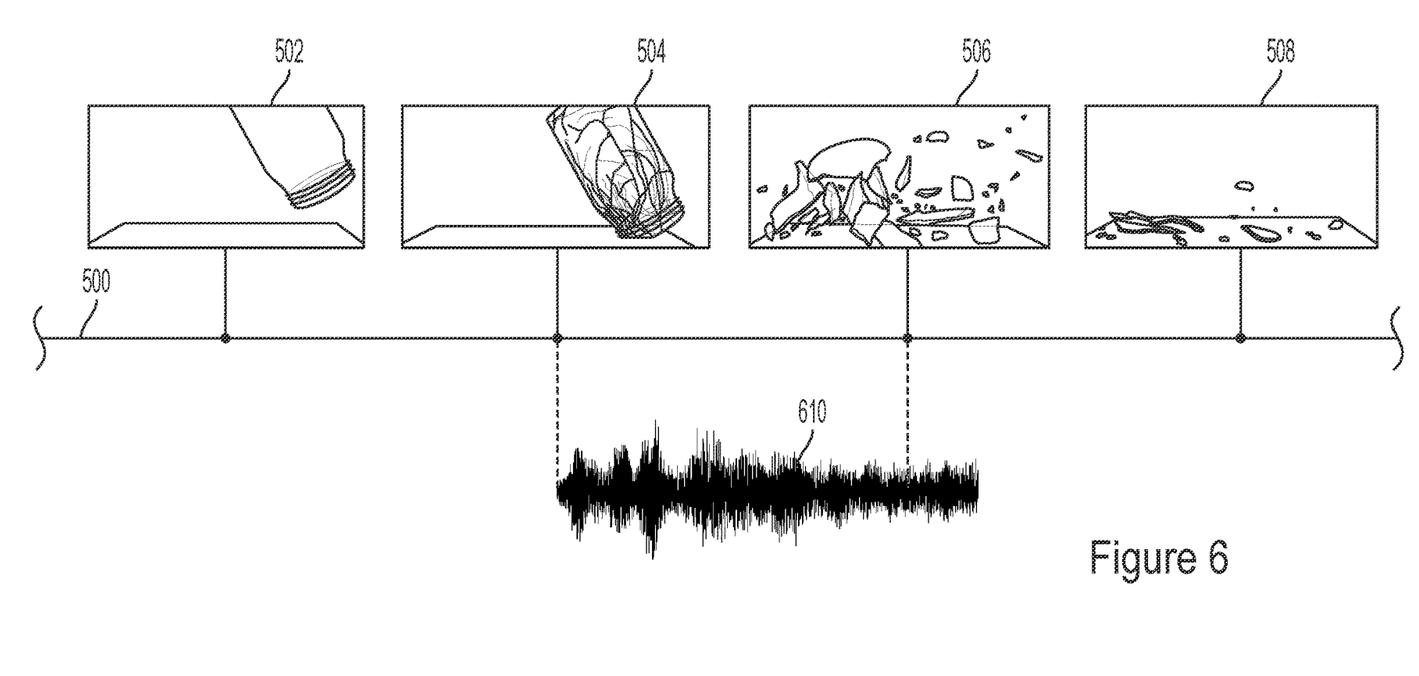
FIG. 6 is a simplified representation of example video content and corresponding audio content, with a second alignment example.

FIG. 6 is a simplified representation of example video content and corresponding audio content, with a second alignment example. The components of FIG. 6 are the same as those in FIG. 5, except that the audio content 510 has been replaced with audio content 610. Here, the duration of the audio content 610 is slightly more than the duration of the event, and the audio content 610 is positioned such that the start of the audio content 610 aligns with the start of the event (at the second frame 504) and the end of the audio content 610 extends after the end of the event (after the third frame 506).

Figure 7:
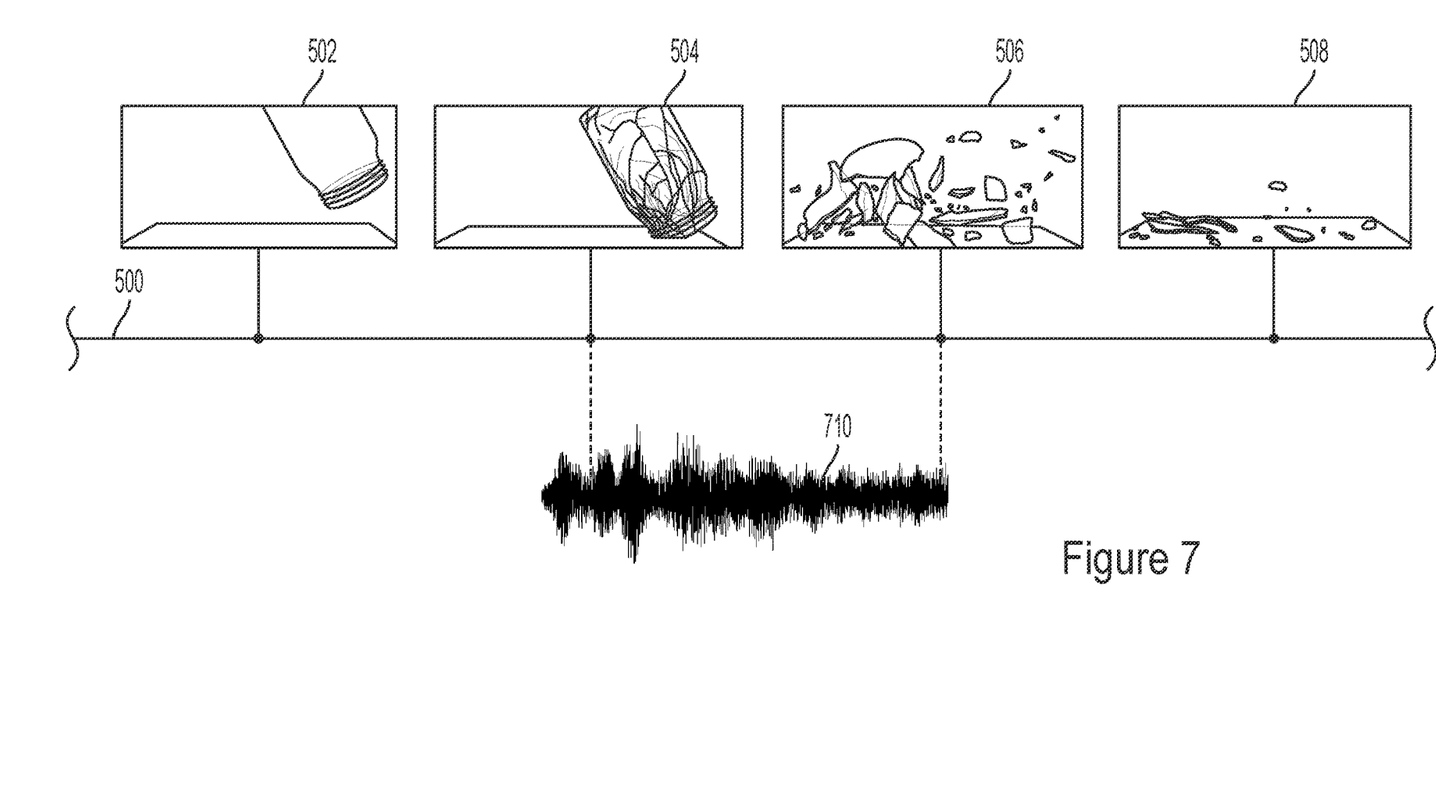
FIG. 7 is a simplified representation of example video content and corresponding audio content, with a third alignment example.

FIG. 7 is a simplified representation of example video content and corresponding audio content, with a third alignment example. The components of FIG. 7 are the same as those in FIG. 5, except that the audio content 510 has been replaced with audio content 710. Here, the duration of the audio content 710 is slightly more than the duration of the event, and the audio content 710 is positioned such that the start of the audio content 710 extends before the start of the event (before the second frame 504) and the end of the audio content 710 aligns with the end of the event (at the third frame 506).

Figure 8:
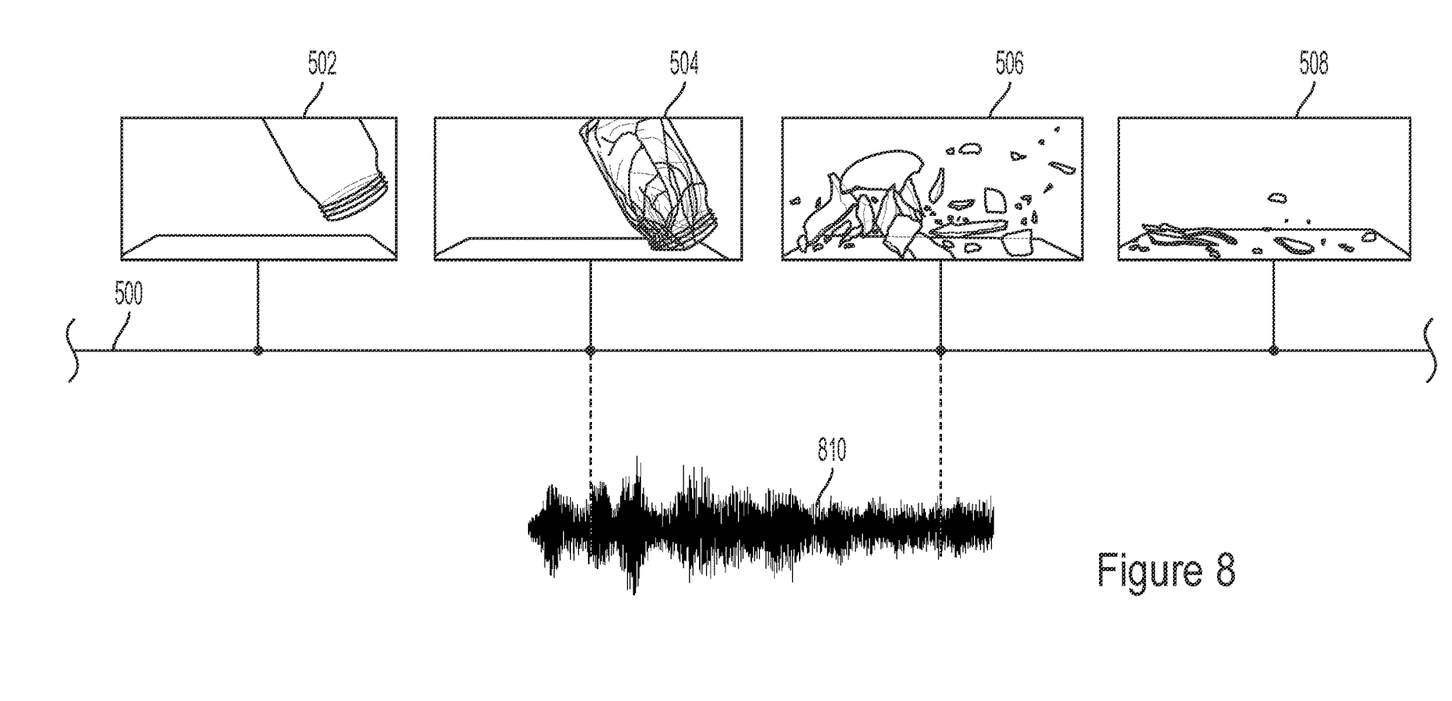
FIG. 8 is a simplified representation of example video content and corresponding audio content, with a fourth alignment example.

FIG. 8 is a simplified representation of example video content and corresponding audio content, with a fourth alignment example. The components of FIG. 8 are the same as those in FIG. 5, except that the audio content 510 has been replaced with audio content 810. Here, the duration of the audio content 810 is slightly more than the duration of the event, and the audio content 810 is positioned such that the start of the audio content 810 extends before the start of the event (before the second frame 504) and the end of the audio content 810 extends after with the end of the event (after the third frame 506).

Figure 9:
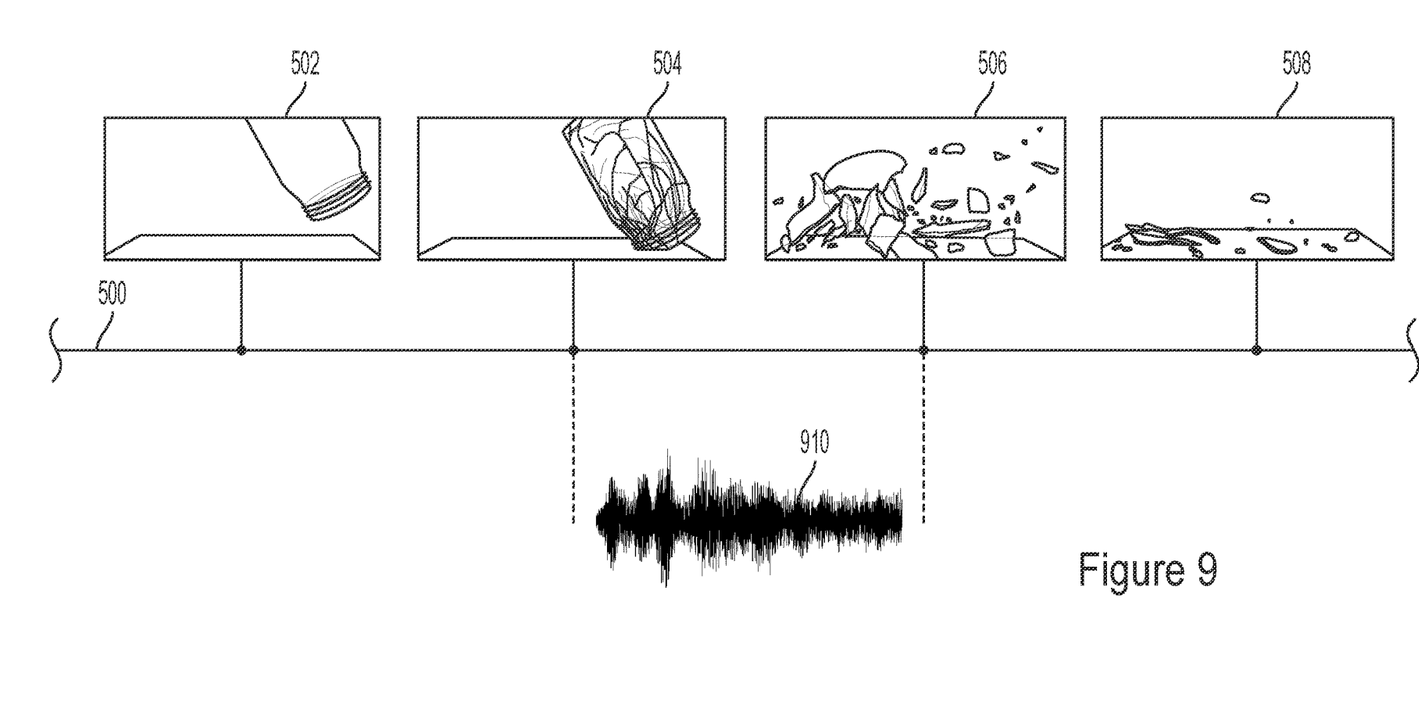
FIG. 9 is a simplified representation of example video content and corresponding audio content, with a fifth alignment example.

FIG. 9 is a simplified representation of example video content and corresponding audio content, with a fifth alignment example. The components of FIG. 9 are the same as those in FIG. 5, except that the audio content 510 has been replaced with audio content 910. Here, the duration of the audio content 910 is slightly less than the duration of the event, and the audio content 910 is positioned such that the start of the audio content 610 starts after the start of the event (after the second frame 504) and the end of the audio content 910 ends before the end of the event (before the third frame 506).

As noted above, the editing system 102 can edit the video content to include the selected audio content in various ways, such as by adding the selected audio content to the video content. In addition, as another example, the editing system 102 can edit the video content to include the selected audio content by replacing an existing audio content portion of the video content with the selected audio content. This could be done by employing any audio replacement technique now known or later discovered and can result in the audio content being aligned in a variety of different ways, such as in the various ways as described above.

In some instances, rather than the editing system 102 automatically editing the video content to include the selected audio content, the video editor can instead present a user interface to help provide a user with a tool for carrying out such content editing. More particularly, in one example, performing the operation that facilitates editing the video content to include the selected audio content can include the editing system 102 (i) prompting, via a user interface, a proposed editing of the video content to include the selected audio content; and (ii) performing the proposed editing or a variation thereof based on input received via the user interface. Among other things, this can allow a user to review, preview, edit, and/or approve/reject one or more proposed edits, such as those outlined above.

After the editing system 102 edits the video content to include the selected audio content, the editing system can store video data of the edited video content (e.g., as a new copy or by overwriting an existing copy) in the video database 104 such that it can be later obtained and used in a variety of ways for various purposes.

For instance, the content-distribution system 108 can obtain the edited video content and transmit it to a content-presentation device 110, which can receive and output for presentation the edited video content.

E. Example Method

Figure 10:
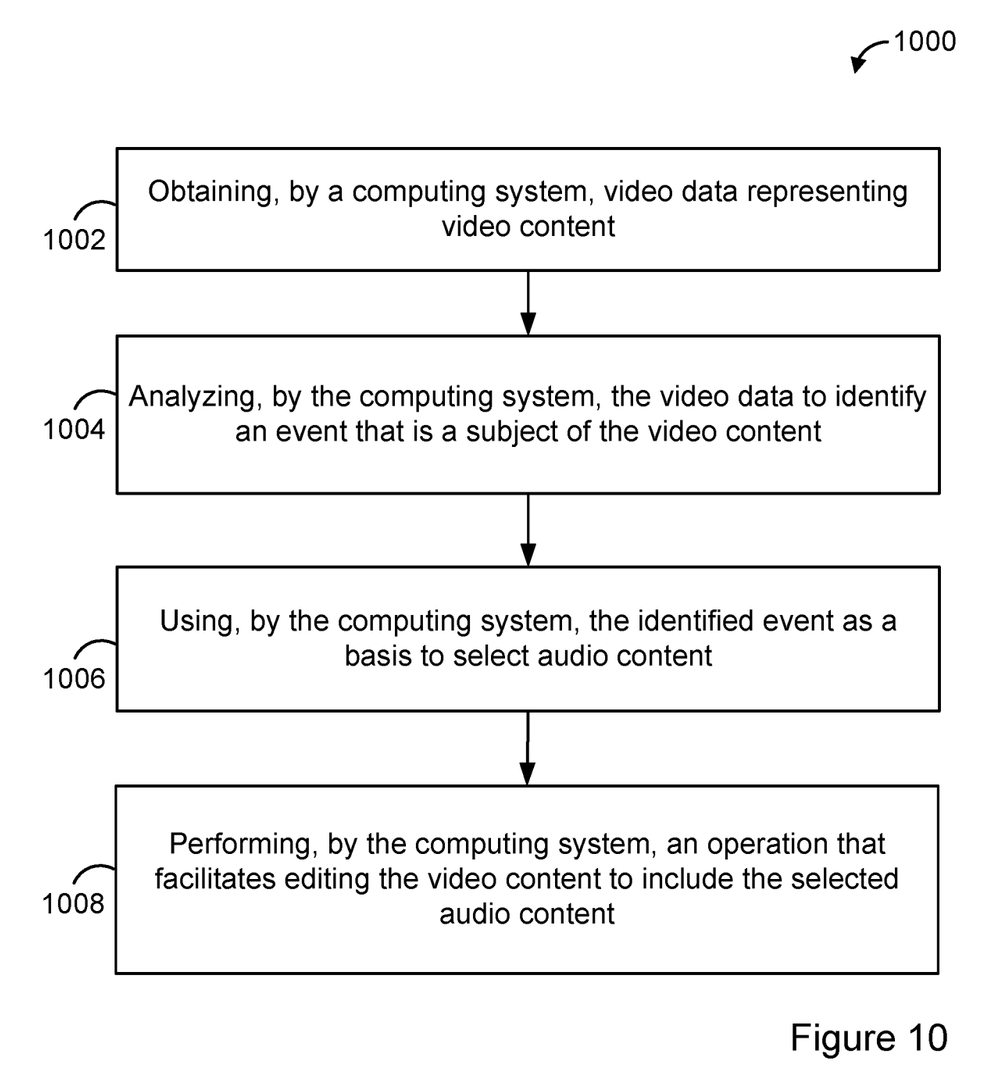
FIG. 10 is a flow chart of an example method.

FIG. 10 is a flow chart illustrating an example method 1000. The method 1000 can be carried out by an editing system, such as the editing system 102, or more generally, by a computing system. At block 1002, the method 1000 includes obtaining, by a computing system, video data representing video content. At block 1004, the method 1000 includes analyzing, by the computing system, the video data to identify an event that is a subject of the video content. At block 1006, the method 1000 includes using, by the computing system, the identified event as a basis to select audio content. And at block 1008, the method 1000 includes performing, by the computing system, an operation that facilitates editing the video content to include the selected audio content.

Figure 11:
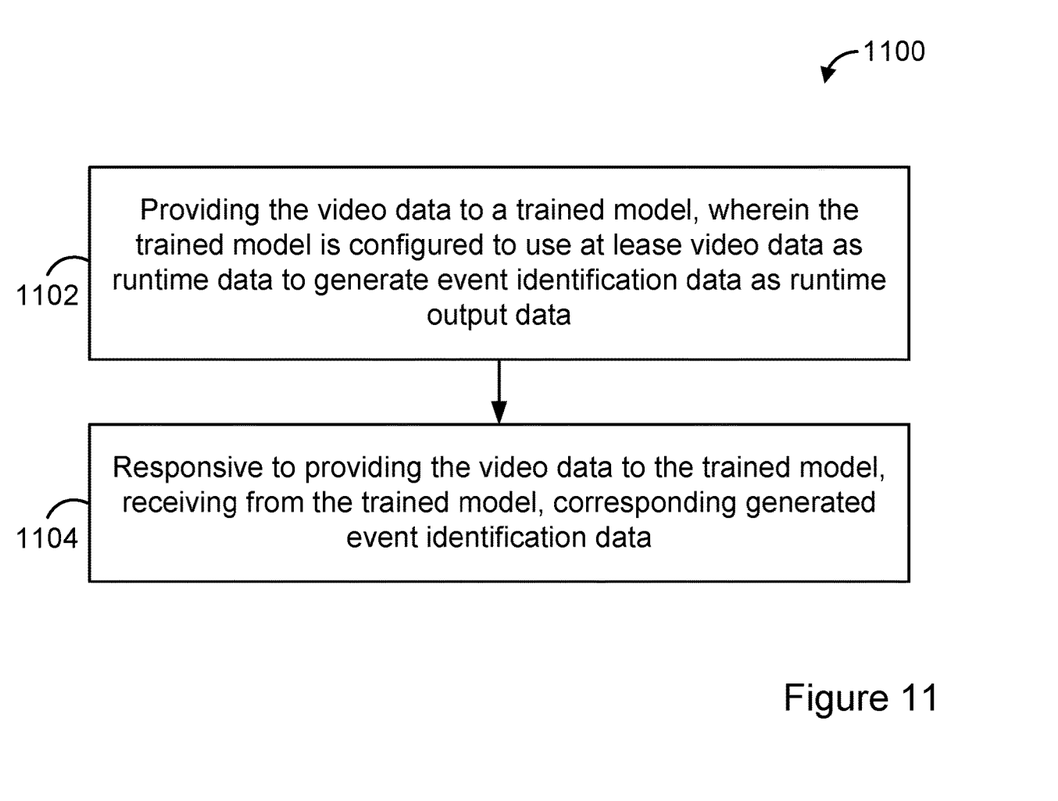
FIG. 11 is a flow chart of another example method.

FIG. 11 is a flow chart illustrating an example method 1100. In one aspect, the method 1100 provides a technique for analyzing the video data to identify the event that is the subject of the video content. The method 1100 can be carried out by an editing system, such as the editing system 102, or more generally, by a computing system. At block 1102, the method 1100 includes providing the video data to a trained model, wherein the trained model is configured to use at lease video data as runtime data to generate event identification data as runtime output data. At block 1104, the method 1100 includes responsive to providing the video data to the trained model, receiving from the trained model, corresponding generated event identification data.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
obtaining, by a computing system, video data representing video content;
analyzing, by the computing system, the video data to identify an event that is a subject of the video content, wherein the analyzing comprises:
providing the video data and closed-captioning data associated with the video content to a trained model, wherein the trained model is configured to use at least video data and closed-captioning data as runtime input data to generate event identification data as runtime output data; and
responsive to providing the video data and the closed-captioning data associated with the video data to the trained model, receiving from the trained model, corresponding generated event identification data;
using, by the computing system, the identified event as a basis to select audio content; and
performing, by the computing system, an operation that facilitates editing the video content to include the selected audio content.

2. The method of claim 1, wherein analyzing the video data to identify the event that is the subject of the video content comprises:
providing the video data to a trained model, wherein the trained model is configured to use at least video data as runtime input data to generate event identification data as runtime output data; and
responsive to providing the video data to the trained model, receiving from the trained model, corresponding generated event identification data.

3. The method of claim 2, wherein the received event identification data further includes event position data that specifies a temporal position of the event within the video content.

4. The method of claim 2, wherein the received event identification data further includes event duration data that specifies a duration of the event within the video content.

5. The method of claim 2, wherein the model was trained by providing to the model as training data, multiple instances of training video data and for each instance of training video data, corresponding training event identification data.

6. The method of claim 1, wherein using the identified event as the basis to select the audio content comprises using mapping data to map event identification data of the identified event to the selected audio content.

7. The method of claim 1, wherein performing the operation facilitates editing the video content to include the selected audio content comprises:
   editing the video content by adding the selected audio content to the video content.

8. The method of claim 1, wherein performing the operation facilitates editing the video content to include the selected audio content comprises:
   editing the video content by replacing an existing audio content portion of the video content with the selected audio content.

9. The method of claim 1, wherein performing the operation that facilitates editing the video content to include the selected audio content comprises:
   prompting, via a user interface, a proposed editing of the video content to include the selected audio content; and
   performing the proposed editing or a variation thereof based on input received via the user interface.

10. The method of claim 1, further comprising transmitting, by the computing system, the edited video content to a content-presentation device for presentation.

11. The method of claim 1, further comprising presenting, by a content-presentation device of the computing system, the edited video content.

12. A computing system configured for performing a set of acts comprising:
   obtaining, by a computing system, video data representing video content;
   analyzing, by the computing system, the video data to identify an event that is a subject of the video content, wherein the analyzing comprises:
      providing the video data and closed-captioning data associated with the video content to a trained model, wherein the trained model is configured to use at least video data and closed-captioning data as runtime input data to generate event identification data as runtime output data; and
      responsive to providing the video data and the closed-captioning data associated with the video data to the trained model, receiving from the trained model, corresponding generated event identification data;
   using, by the computing system, the identified event as a basis to select audio content; and
   performing, by the computing system, an operation that facilitates editing the video content to include the selected audio content.

13. The computing system of claim 12, wherein analyzing the video data to identify the event that is the subject of the video content comprises:
   providing the video data to a trained model, wherein the trained model is configured to use at least video data as runtime input data to generate event identification data as runtime output data; and
   responsive to providing the video data to the trained model, receiving from the trained model, corresponding generated event identification data.

14. The computing system of claim 13, wherein the received event identification data further includes event position data that specifies a temporal position of the event within the video content.

15. The computing system of claim 13, wherein the received event identification data further includes event duration data that specifies a duration of the event within the video content.

16. The computing system of claim 13, wherein the model was trained by providing to the model as training data, multiple instances of training video data and for each instance of training video data, corresponding training event identification data.

17. The computing system of claim 12, wherein using the identified event as the basis to select the audio content comprises using mapping data to map event identification data of the identified event to the selected audio content.

18. A non-transitory computer-readable medium having stored thereon program instructions that upon execution by a computing system, cause performance of a set of acts comprising:
   obtaining, by a computing system, video data representing video content;
   analyzing, by the computing system, the video data to identify an event that is a subject of the video content, wherein the analyzing comprises:
      providing the video data and closed-captioning data associated with the video content to a trained model, wherein the trained model is configured to use at least video data and closed-captioning data as runtime input data to generate event identification data as runtime output data; and
      responsive to providing the video data and the closed-captioning data associated with the video data to the trained model, receiving from the trained model, corresponding generated event identification data:
   using, by the computing system, the identified event as a basis to select audio content; and
   performing, by the computing system, an operation that facilitates editing the video content to include the selected audio content.

* * * * *